US012052532B2

(12) United States Patent
Della Chiesa et al.

(10) Patent No.: US 12,052,532 B2
(45) Date of Patent: Jul. 30, 2024

(54) CABLE IDENTIFICATION AND PHYSICAL ROUTE TRACING USING STATE OF POLARIZATION OR PHASE COHERENT MEASUREMENTS

(71) Applicant: Cisco Technology, Inc., San Jose, CA (US)

(72) Inventors: Luca Della Chiesa, Cesenatico (IT); Christian Schmutzer, Koenigsbrunn im Weinviertel (AT)

(73) Assignee: CISCO TECHNOLOGY, INC., San Jose, CA (US)

( * ) Notice: Subject to any disclaimer, the term of this patent is extended or adjusted under 35 U.S.C. 154(b) by 87 days.

(21) Appl. No.: 17/871,093

(22) Filed: Jul. 22, 2022

(65) Prior Publication Data

US 2024/0031710 A1  Jan. 25, 2024

(51) Int. Cl.

| | |
|---|---|
| *G01H 9/00* | (2006.01) |
| *H04B 10/07* | (2013.01) |
| *H04B 10/073* | (2013.01) |
| *H04B 10/61* | (2013.01) |
| *H04Q 11/00* | (2006.01) |

(52) U.S. Cl.
CPC ......... *H04Q 11/0062* (2013.01); *G01H 9/004* (2013.01); *H04B 10/07* (2013.01); *H04B 10/073* (2013.01); *H04B 10/615* (2013.01); *H04Q 2011/0073* (2013.01); *H04Q 2011/0083* (2013.01)

(58) Field of Classification Search
None
See application file for complete search history.

(56) References Cited

U.S. PATENT DOCUMENTS

| 9,243,973 B2 * | 1/2016 | Frigo | ............ | H04B 10/07 |
| 11,777,598 B2 * | 10/2023 | Amiri | ............ | G06N 3/0464 |
| | | | | 398/28 |

(Continued)

FOREIGN PATENT DOCUMENTS

| CN | 113438016 A | | 9/2021 |
| JP | 05209810 A | * | 8/1999 |
| JP | H05209810 A | | 8/1999 |

OTHER PUBLICATIONS

Medhi, Von Neumann Architecture, 2012 (Year: 2012).*

(Continued)

*Primary Examiner* — Jai M Lee
(74) *Attorney, Agent, or Firm* — Edell, Shapiro & Finnan, LLC

(57) ABSTRACT

Presented herein are techniques to manage optical network infrastructure. A method includes inducing a predetermined vibration on a fiber optic cable, the predetermined vibration being sufficient to cause a change to at least one of a state of polarization and a phase of optical signals being carried by respective optical fibers in the fiber optic cable, detecting, at a first endpoint, using a first coherent optical receiver, and at a second endpoint, using a second coherent optical receiver, the change to the at least one of the state of polarization and the phase of the optical signals, and based on the detecting, determining that the first endpoint and the second endpoint are connected to, or in communication with, one another via at least one fiber in the fiber optic cable.

20 Claims, 6 Drawing Sheets

(56) References Cited

U.S. PATENT DOCUMENTS

| | | | |
|---|---|---|---|
| 11,802,810 B2* | 10/2023 | Xia | G01M 11/3145 |
| 2007/0264012 A1 | 11/2007 | Healey et al. | |
| 2020/0124735 A1* | 4/2020 | Huang | G01H 9/004 |
| 2020/0389230 A1* | 12/2020 | Bergano | H04B 10/07 |
| 2021/0255344 A1 | 8/2021 | Kamalov et al. | |
| 2021/0278314 A1* | 9/2021 | Xia | G01M 7/00 |
| 2021/0356613 A1* | 11/2021 | Ip | G01V 1/38 |
| 2022/0171081 A1* | 6/2022 | Le | H04J 14/02 |
| 2022/0236083 A1* | 7/2022 | Ip | G01H 9/004 |

OTHER PUBLICATIONS

Mecozzi et al., Optica, "Polarization sensing using submarine optical cables," 788 vol. 8, No. 6, Jun. 2021, Optica Research Article, 2334-2536/21/060788-08 Journal 2021 Optical Society of America, 8 pages.

Jouseet et al., Nature Communications, "Dynamic strain determination using fibre-optic cables allows imaging of seismological and structural features," Article, DOI: 10.1038/s41467-018-04860-y, www.nature.com/naturecommunications, retrieved Aug. 19, 2022, 11 pages.

Chauvel, /Inritsu Corp., "Dispersion in Optical Fibers," retrieved Aug. 5, 2022, 12 pages.

* cited by examiner

| ROUTER | DSP PORT | VIBRATION SIGNATURE | TIMESTAMP | COORDINATES |
|---|---|---|---|---|
| R1A | | XXXX | 22:10:10 | |
| R1B | | YYYY | 11:15:25 | |
| R2 | | XXXX | 22:10:10 | |
| R3 | | YYYY | 11:15:25 | |
| R2 | | ZZZZ | 08:15:00 | LAT1 LONG1 |
| R2 | | ZZZZ | 08:15:00 | LAT2 LONG2 |
| R2 | | ZZZZ | 08:16:00 | LAT3 LONG3 |
| R2 | | ZZZZ | 18:16:30 | LAT4 LONG4 |

FIG.4

CABLE IDENTIFICATION AND PHYSICAL ROUTE TRACING USING STATE OF POLARIZATION OR PHASE COHERENT MEASUREMENTS

TECHNICAL FIELD

The present disclosure relates to optical network management, and more particularly to collecting and validating accurate physical fiber optic cable information.

BACKGROUND

Over the years, substantial optical communications infrastructure, including fiber optic cable, has been installed to satisfy the ever-growing demand for communication. Much of this infrastructure is located underground, and in many cases run through conduits for increased protection. Fiber optic cable can also be found strung between telephone poles, and is, of course, installed inside buildings or other structures. Unfortunately, in many instances, accurate information about the precise location of this infrastructure is not available. Indeed, it is estimated that cabling location databases may have error rates of up to 20%.

Thus, network operators struggle in many instances with trying to understand how fiber optic cable is actually, physically, routed. Without a full and accurate understanding of the physical layout, path, or location of individual fiber optic cables, and which endpoints are connected via a given fiber optic cable, it is difficult to manage risk and/or establish appropriate redundancy, applicable to various networking schemes such as dense wavelength division multiplexing (DWDM), optical transport networks (OTNs), and Internet Protocol/Multiple Protocol Label Switching (IP/MPLS).

BRIEF DESCRIPTION OF THE DRAWINGS

FIG. 4 is an example database that is used to correlate a given fiber optic cable with associated optical network equipment, according to an example embodiment.

DESCRIPTION OF EXAMPLE EMBODIMENTS

Overview

Figure 1:
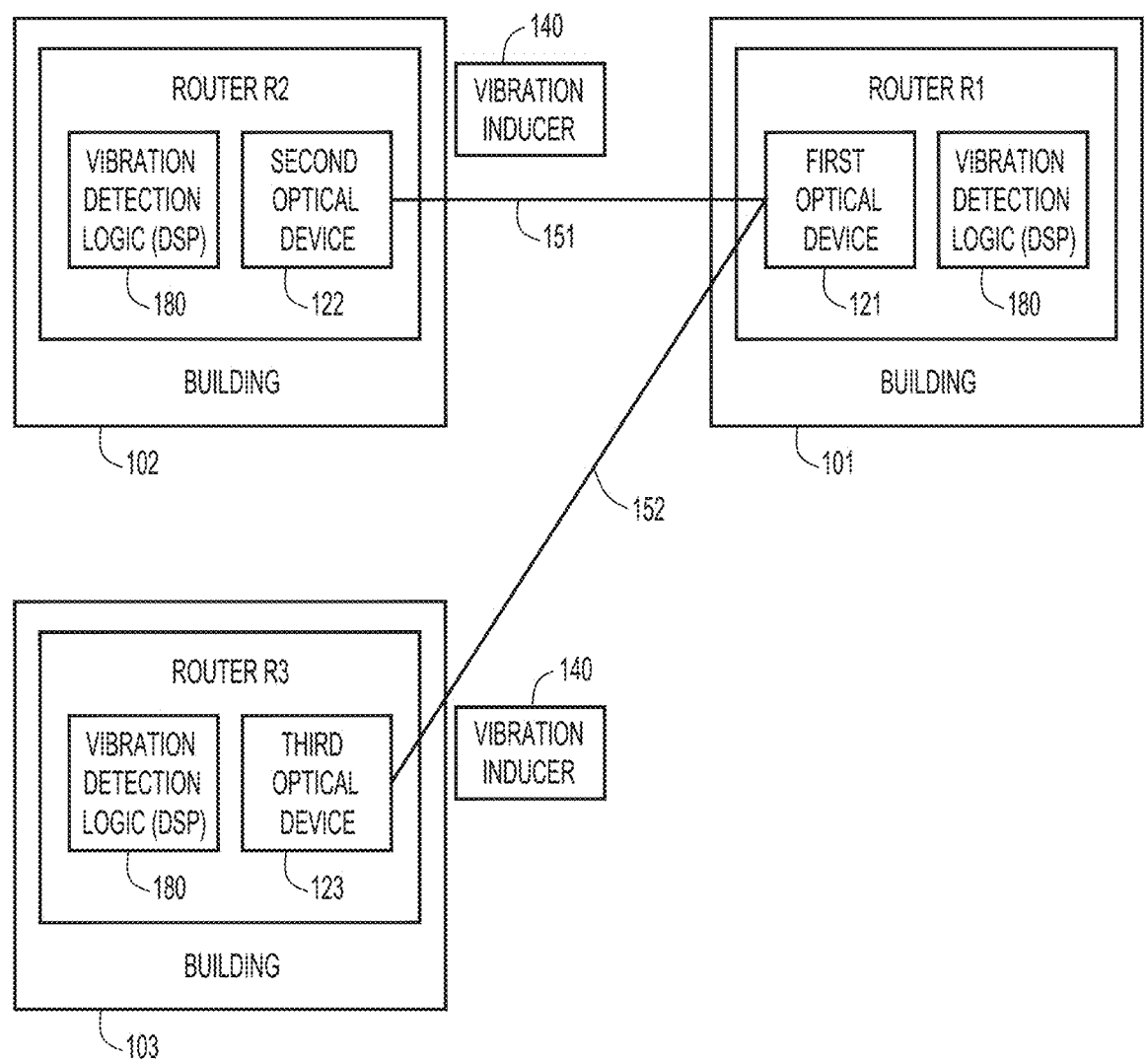
FIG. 1 shows an optical network along with vibration inducers and vibration detection logic, according to an example embodiment.

Presented herein are techniques to manage optical network infrastructure. A method includes inducing a predetermined vibration on a fiber optic cable, the predetermined vibration being sufficient to cause a change to at least one of a state of polarization and a phase of optical signals being carried by optical fibers in the fiber optic cable, detecting, at a first endpoint, using a first coherent optical receiver, and at a second endpoint, using a second coherent optical receiver, the change to the at least one of the state of polarization and the phase of the optical signals, and based on the detecting, determining that the first endpoint and the second endpoint are in communication with one another via at least one fiber in the fiber optic cable.

In another embodiment, a device is provided. The device includes an interface configured to enable network communications, a memory, and one or more processors coupled to the interface and the memory, and configured to: induce a predetermined vibration on a fiber optic cable, the predetermined vibration being sufficient to cause a change to at least one of a state of polarization and a phase of optical signals being carried by optical fibers in the fiber optic cable, detect, at a first endpoint, using a first coherent optical receiver, and at a second endpoint, using a second coherent optical receiver, the change to the at least one of the state of polarization and the phase of the optical signals, and based on detecting the change to the at least one of the state of polarization and the phase of the optical signals, determining that the first endpoint and the second endpoint are in communication with one another via at least one fiber in the fiber optic cable.

EXAMPLE EMBODIMENTS

Described herein is an approach to better account for fiber optic cable infrastructure by inducing a predetermined vibration on a given fiber optic cable and detecting at endpoints, e.g., respective coherent optical receivers, any state of polarization change or phase change of received optical signals resulting from the induced vibration. The vibration inducement can be implemented at a given location, e.g., near a cable cabinet, building egress location, etc., or by using a vehicle that drives around and induces vibration into roadways. This detection of the state of polarization change or phase change of received optical signals can then be used to confirm that two endpoints are in communication with one another via at least one fiber in the fiber optic cable upon which the vibration was induced. The vehicle approach can be used to identify whether two or more fiber optic cables may be physically located too close to one another and thereby undermine desired fiber optic cable or network redundancy.

More specifically, digital signal processors (DSPs) associated with optical coherent dense wavelength division multiplexed (DWDM) interfaces (i.e., coherent optical receivers) have the capability to provide state of polarization (SOP) and phase measurements at a sampling rate of, e.g., up to 100 KHz.

In accordance with an embodiment, a transducer can be configured to induce vibration on respective fiber optic cables. Such induced vibration can create SOP changes and phase changes that can be detected by the DSPs disposed at respective DSP ports. Moreover, if such induced vibration is modulated it can be used to transmit messages over the wavelengths traversing the individual fibers in the fiber optic cable.

Given the available DSP sampling bandwidth, it is possible, in accordance with one embodiment, to create multiple carriers modulated at low frequency that can transmit any desired information via the fiber optic cable (i.e., all the fibers within the fiber optic cable).

Thus, as will be explained in more detail below, and in accordance with one embodiment, it may be useful to modulate, via vibration, a cable identifier, an alarm or notification, and, perhaps, GPS information that can be manually programmed or automatically provided by a GPS receiver, onto a fiber optic cable.

As all DWDM signals are bidirectional, and most of optical infrastructure supports time of day signaling, the SOP/phase messaging transmission capability described herein can also be used for localization of where a vibration is imposed. Using this technique, a network operator can correlate DWDM wavelengths to fiber cables and perform geo location. If installed temporarily, a database can be populated or one-time updated with accurate information on which DWDM wavelength is carried over a potentially impacted fiber optic cable.

If transducers are installed (semi-)permanently, periodic updates (telemetry) can be fed into a database that is kept up to date and is able to change over time such that changes over time can be recorded.

Also, a vibration transducer-equipped vehicle can be used to discover fiber optical cable routing and record exact waypoints of the physical fiber plant for a network operator.

Knowing which fiber optic cable a DWDM wavelength is sent across and whether one or more fiber optic cables are routed across a common geo location is helpful for network operators to identify shared risks. Such shared risks are considered when designing highly available services, i.e., 99.999% available and when preparing (i.e., moving traffic away from affected resources) for planned network maintenance activities.

Reference is now made to the figures, beginning with FIG. 1, which shows an optical network along with vibration inducers 140 and vibration detection logic 180, according to an example embodiment. As shown in the figure, three buildings, building 101, building 102, and building 103, each comprises, respectively, router R1, router R2, and router R3. Each of those routers operates in conjunction with, respectively, a first optical device 121, a second optical device 122, and a third optical device 123, which may be coherent optical receivers, transmitters, or transceivers, configured to convert optical signals to electrical signals and/or electrical signals to optical signals. The first optical device 121 is in communication with second optical device 122 via fiber optic cable 151 (i.e., at least one fiber within fiber optic cable 151). Similarly, first optical device 121 is in communication with third optical device 123 via fiber optic cable 152 (i.e., at least one fiber within fiber optic cable 152). Functionality of first optical device 121, second optical device 122, and third optical device 123, may be provided by a digital signal processor (DSP), which also executes vibration detection logic 180 as will be described more fully below. Also shown in FIG. 1 are vibration inducers 140 associated, respectively, and deployed adjacent fiber optic cable 151 and fiber optic cable 152, such as near a cable cabinet or cable ingress/egress location.

In operation, vibration inducer 140 associated with fiber optic cable 151 may be controlled to induce a vibration on fiber optic cable 151. That vibration is configured to cause a state of polarization change or a phase change to the optical signals being carried by respective optical fibers in fiber optic cable 151. Vibration detection logic 180, executed by its respective DSP, is configured to detect those polarization changes or phase changes.

Figure 2:
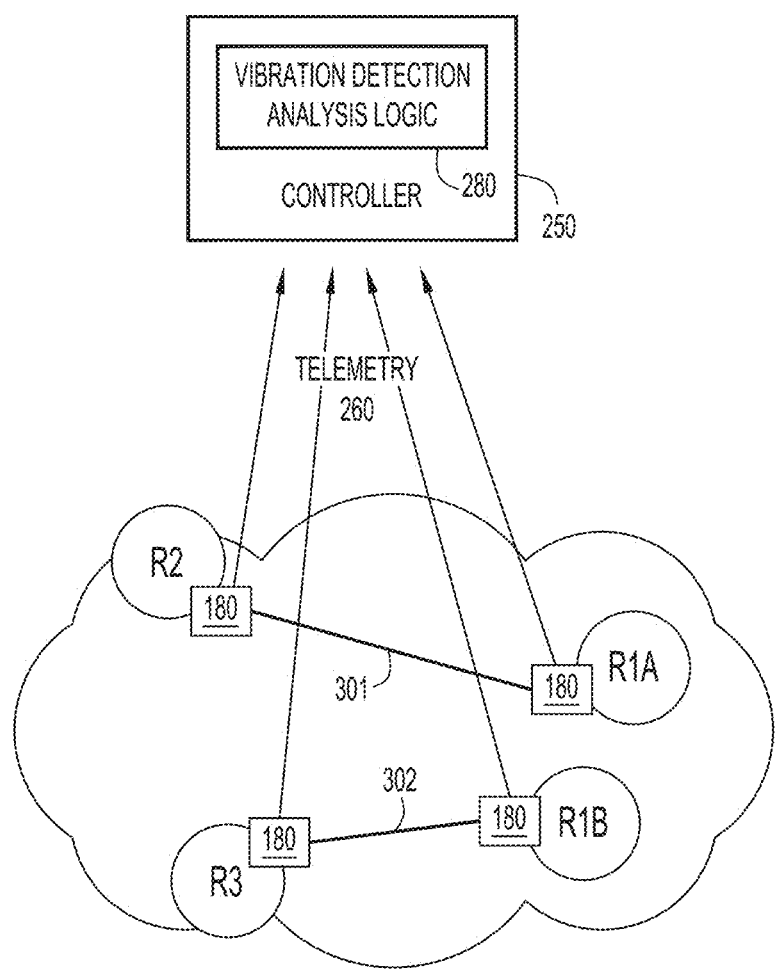
FIG. 2 shows a controller that is configured with vibration detection analysis logic which communicates with vibration detection logic, determines which physical fiber optic cables interconnect optical network equipment, and, in some implementations, described in connection with FIGS. 3 and 4, identifies shared risk for the infrastructure, according to an example embodiment.

FIG. 2 shows a controller 250, including vibration detection analysis logic 280, that communicates with vibration detection logic 180, determines which physical fiber optic cables interconnect optical network equipment, and, in an implementation described in connection with FIGS. 3 and 4, identifies shared risk for the infrastructure, according to an example embodiment. That is, each instance of vibration detection logic 180 operating on each of routers R1A, RiB (router R1 being split in this illustration), R2, and R3, supply telemetry 260 to controller 250 and vibration detection analysis logic 280. Telemetry 260 is representative of a state of polarization change or a phase change that has come about as a result of, perhaps, vibration induced by vibration inducer 140, and was detected by vibration detection logic 180. Telemetry 260 may also include demodulated data that was modulated into a vibration induced by a given one of the vibration inducers 140 (or by a mobile vehicle as described in connection with FIG. 3). Such data might include a cable identifier, an alarm or notification, or location data, among other possible types of information.

In an embodiment, controller 250 receives telemetry 260 along with timestamp information, or tags telemetry 260 with a timestamp upon receipt, and is configured to determine whether two endpoints (e.g., router R1A and router R2, or vibration detection logic 180 executed by respective DSPs) have detected a same state of polarization change or phase change at substantially the same time. That is, controller 250 along with vibration detection analysis logic 280 is configured to correlate timings of detected state of polarization changes or phase changes. For instance, if two endpoints (e.g., router R1A and router R2) detect the same state of polarization change or phase change at substantially the same time, it suggests that the two endpoints are in communication with one another, and thus connected to each other via at least one fiber in the fiber optic cable, i.e., the fiber optic cable upon which a vibration was induced, or via a same series of fibers in the case that the optical link comprises multiple fibers. Of course, if demodulated data in telemetry 260 includes a cable identifier, then it is evident that router R1A and router R2 are connected to a same fiber optic cable with that identifier.

Figure 3:
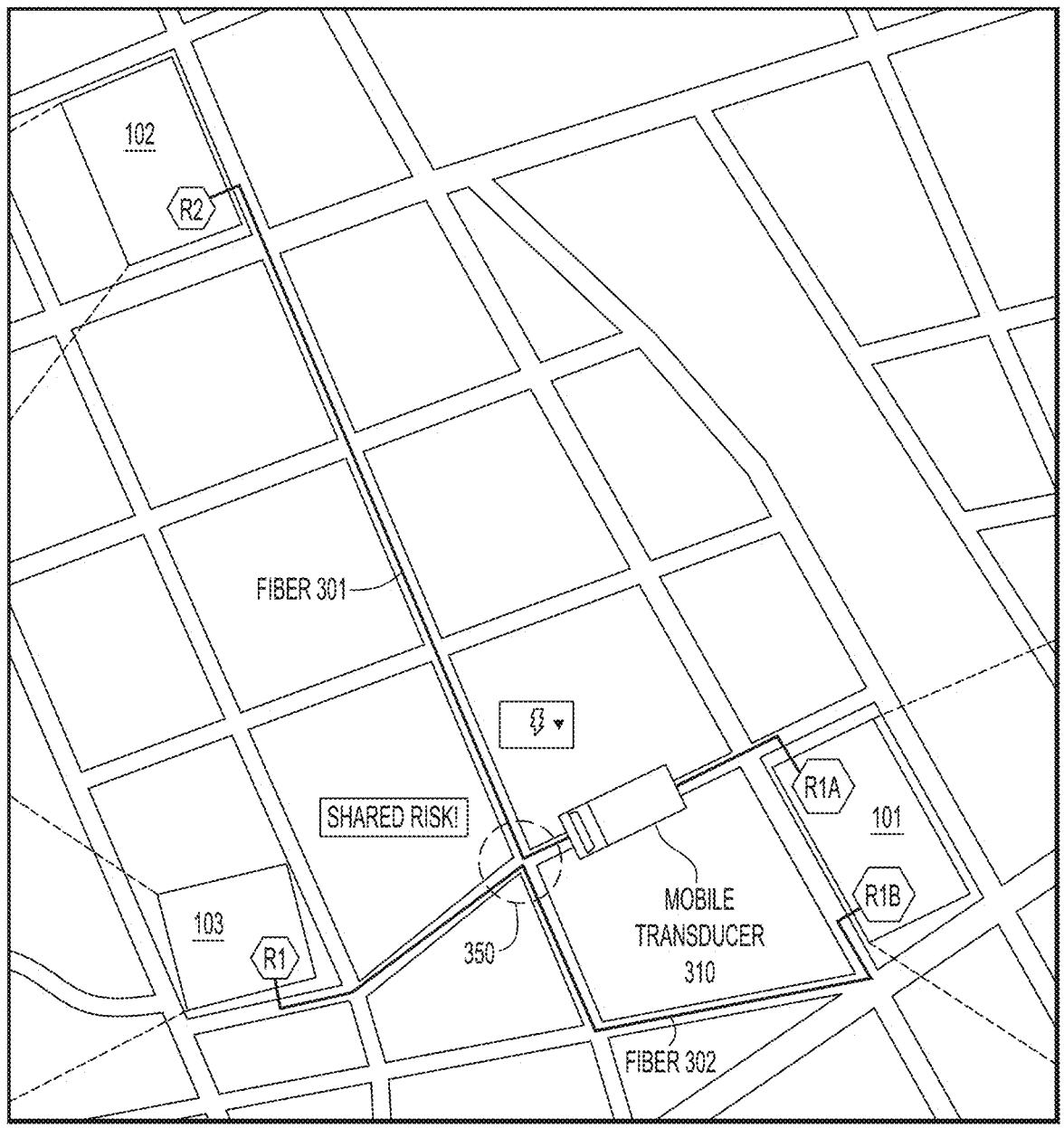
FIG. 3 shows the use of a mobile vibration inducing vehicle that helps to map physical fiber optic cables that interconnect optical network equipment, according to an example embodiment.

FIG. 3 shows the use of a mobile vibration inducing vehicle that may help to map physical fiber optic cables that interconnect optical network equipment, according to an example embodiment. As shown in the figure, mobile transducer 310 drives around a given geographic area. In many cases, fiber optic cable infrastructure is laid under roadways that mobile transducer 310 will eventually drive along. As mobile transducer 310 drives along the roadways it induces vibration such that fiber optic cables 301, 302 will be impacted. In an embodiment, the vibration induced by mobile transducer 310 includes GPS location information (of the vehicle) modulated into the vibration. Vibration detection logic 180, deployed at the several routers R1A, R1B, R2, R3 may be configured to demodulate that GPS location information and supply the demodulated information via telemetry 260 back to controller 250. In this way, given a series of received geo location coordinates, a full mapping of a given fiber optic cable can be generated. Further, mobile transducer 310 can be sent out periodically to areas that have not been surveyed for some time to confirm pathways of fiber optic cable in those areas.

Notably, where multiple fiber optic cables are used for purposes of redundancy to support high availability connectivity, it is possible with the approach described herein to identify where two fiber optic cables might share a common physical path, which could inadvertently increase the potential for network failure. For instance, location 350 shown in FIG. 3 shows how fiber optic cable 301 and fiber optic cable 302 are laid through the same road intersection. As such, road construction at that one intersection could inadvertently cause the failure of both fiber optic cables 301, 302 such that connectivity between building 101 and buildings 102 and 103 would be fail entirely. By accurately mapping the locations of fiber optic cable 301 and fiber optic cable 302, a network operator can ensure that fiber optic cables that provide redundancy are physically distant from each other, thereby reducing overall risk to network connectivity.

In one possible embodiment, controller 250 along with, e.g., vibration detection analysis logic 280, is configured to cause vibration inducers 140 to induce vibration on a given fiber optic cable. In this way, controller 250 along with vibration detection analysis logic 280 would be configured to receive telemetry 260 very soon after commanding the vibration inducers 140 to operate, or in accordance with some predetermined schedule.

FIG. 4 is an example database or table that may be used to correlate a given fiber optic cable with associated optical network equipment, according to an example embodiment. As shown in the figure, vibration detection logic 180 at routers R1A and R2 detect the effects of vibration "XXXX" at substantially the same time, and vibration detection logic 180 at routers RiB and R3 detect the effects of a vibration "YYYY" also at substantially the same time. The effects of the vibrations, in the form of state of polarization changes or phase changes resulting from an induced vibration are detected by vibration detection logic 180 at each router. The detection information is then supplied to controller 250 via telemetry 260, as explained above. Because two endpoints (e.g., routers, or DSP ports on a given router) detect the same effects of a given vibration at substantially the same time, it can be determined which fiber optic cable interconnects those endpoints. It is noted that each fiber in a fiber optic cable may carry multiple channels or wavelengths and each wavelength corresponds to a router interface that comprises a DSP port. As such, each DSP port corresponds to a given channel or wavelength.

The table in FIG. 4 can also be extended to include GPS location data (coordinates). As mobile transducer 310 travels along its path, it may modulate its GPS coordinates (and, perhaps also, timestamp information) into the vibration ZZZZ it is inducing such that those coordinates can be demodulated by vibration detection logic 180, which then, in turn, sends those coordinates to controller 250 via telemetry 260. A time series of coordinates (Lat1, Long1, Lat2, Long2, Lat3, Long3, Lat4, Long4) may then be recorded by controller 250 and vibration detection analysis logic 280. The time series of coordinates can then be matched or correlated to a map to provide an accurate mapping of fiber optic cable infrastructure in a given area.

In one possible implementation, an alarm or notification could be modulated into the induced vibration. Such an alarm or notification might include a fire alarm, a notification of a future power outage, a notification of a future network maintenance, etc. The alarm or notification may then be acted upon directly by an endpoint, or once controller 250 and vibration detection analysis logic 280 receives indications of the alarm or notification via telemetry 260, controller 250 may take action via some other channel. Thus, those skilled in the art will appreciate that the alarm or notification modulated into an induced vibration is a form of in-band messaging. The same may be said about the basic vibration inducing (without modulated data), as no separate channel or wavelength or control plane infrastructure is needed to disseminate information (vibrations) onto any given fiber optic cable. It will be appreciated that that the alarm or notification detection may then automatically trigger some other action, without the need for human intervention.

It is noted that the embodiments described herein focused on detecting at two endpoints the impact of induced vibration. However, in some implementations of an optical network, a reconfigurable optical add-drop multiplexer (ROADM) may be deployed to switch traffic at the wavelength level, making it possible that more than two endpoints might receive the traffic. In such a case, telemetry 260 might be received from more than two endpoints.

Figure 5:
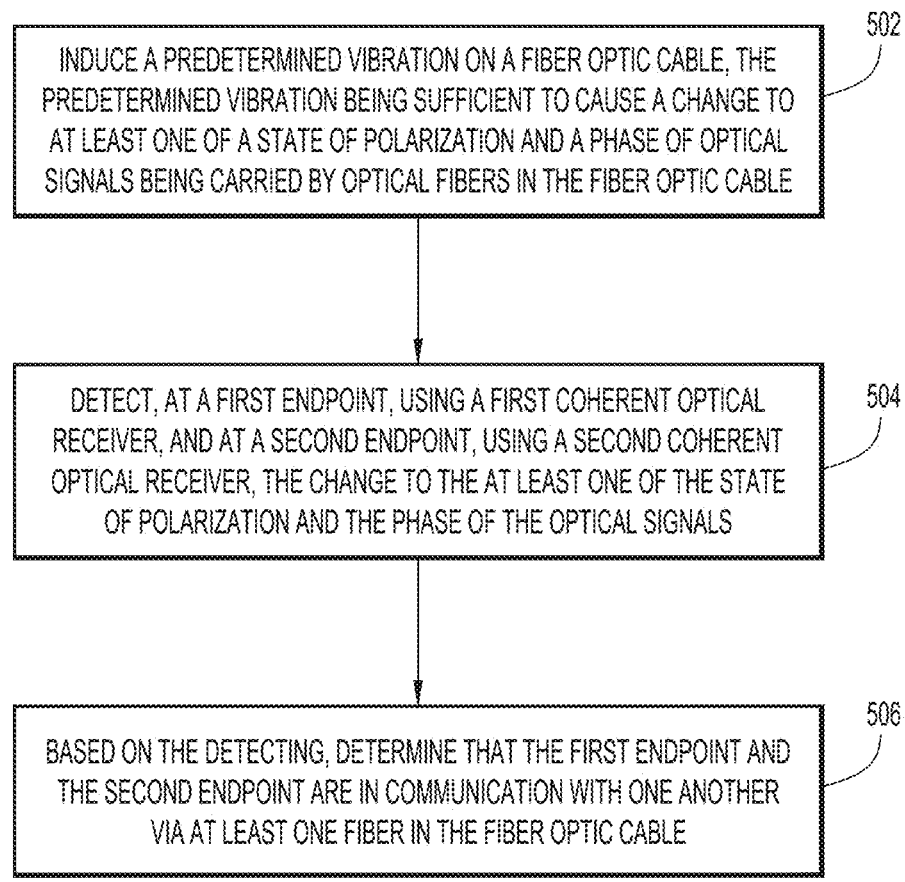
FIG. 5 is a flow chart of operations executed, at least in part, by vibration detection logic, according to an example embodiment.

FIG. 5 is a flow chart of operations executed, at least partially, by vibration detection logic, according to an example embodiment. At 502, an operation is configured to induce a predetermined vibration on a fiber optic cable, the predetermined vibration being sufficient to cause a change to at least one of a state of polarization and a phase of optical signals being carried by respective optical fibers in the fiber optic cable. At 504, an operation is configured to detect, at a first endpoint, using a first coherent optical receiver, and at a second endpoint, using a second coherent optical receiver, the change to the at least one of the state of polarization and the phase of the optical signals. And, at 506, an operation is configured to, based on the detecting, determine that the first endpoint and the second endpoint are in communication with one another via at least one fiber in the fiber optic cable.

Figure 6:
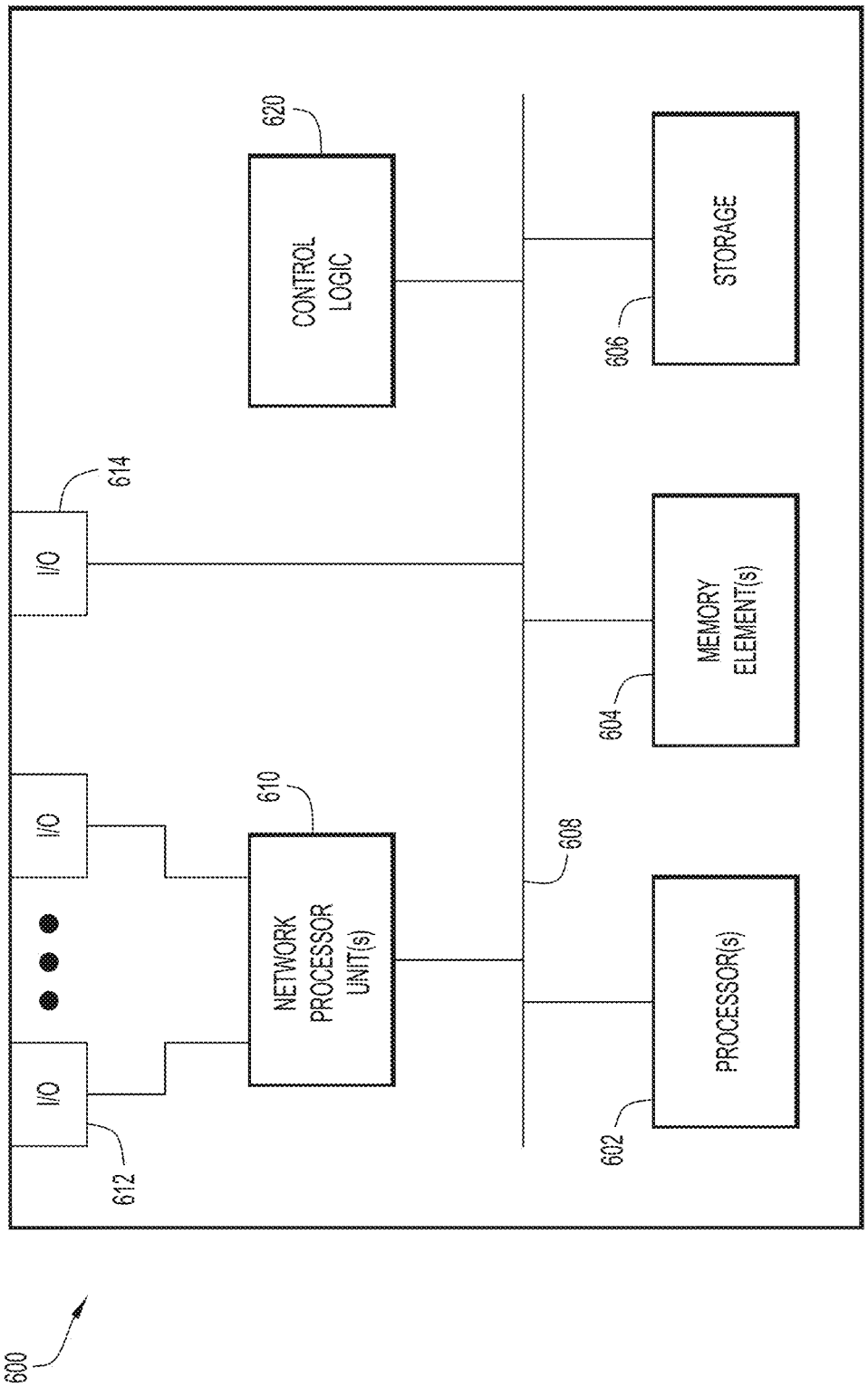
FIG. 6 is a block diagram of a network device or a controller that may be configured to host, respectively, vibration detection logic, and vibration detection analysis logic, and perform the techniques described herein, according to an example embodiment.

FIG. 6 is a block diagram of a network device or a controller that may be configured to host, respectively, vibration detection logic 180, and vibration detection analysis logic 280, and perform the techniques described herein, according to an example embodiment.

In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620 (which could include, for example, vibration detection logic 180 or vibration detection analysis logic 280). In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

In sum, in one embodiment a method is provided. The method may include inducing a predetermined vibration on a fiber optic cable, the predetermined vibration being sufficient to cause a change to at least one of a state of polarization and a phase of optical signals being carried by optical fibers in the fiber optic cable, detecting, at a first endpoint, using a first coherent optical receiver, and at a second endpoint, using a second coherent optical receiver, the change to the at least one of the state of polarization and the phase of the optical signals, and based on the detecting, determining that the first endpoint and the second endpoint are in communication with one another via at least one fiber in the fiber optic cable.

The method may also include inducing the predetermined vibration adjacent a building.

The method may further include detecting the change to the at least one of the state of polarization and the phase of the optical signals at a third endpoint.

In the method, inducing the predetermined vibration may be performed with a mobile device.

In the method, the mobile device may be conveyed by a motor vehicle.

In the method, the optical signals may be data communication signals passing between the first endpoint and the second endpoint.

The method may further include modulating information into the predetermined vibration.

In the method, the information may include at least one of a cable identifier and location information.

The method may further include geo-mapping a route of the fiber optic cable based on the location information.

In the method, the determining may include correlating a first time that the first coherent optical receiver detects the at least one of the state of polarization and the phase of the optical signal and a second time that the second coherent optical receiver detects the at least one of the state of polarization and the phase of the optical signal.

In still another embodiment, a device may be provided. The device may include an interface configured to enable network communications, a memory, and one or more processors coupled to the interface and the memory, and configured to: cause a predetermined vibration to be induced on a fiber optic cable, the predetermined vibration being sufficient to cause a change to at least one of a state of polarization and a phase of optical signals being carried by optical fibers in the fiber optic cable, receiving, from a first endpoint using a first coherent optical receiver, and from a second endpoint using a second coherent optical receiver, an indication of the change to the at least one of the state of polarization and the phase of the optical signals, and based on the indication, determining that the first endpoint and the second endpoint are in communication with one another via at least one fiber in the fiber optic cable.

The predetermined vibration may be induced with a fixed device.

The fixed device may be adjacent a building.

In an embodiment, the predetermined vibration may be induced with a mobile device.

The mobile device may be conveyed by a motor vehicle.

In an embodiment, the optical signals may be data communication signals passing between the first endpoint and the second endpoint.

In an embodiment, the predetermined vibration may include information modulated into the predetermined vibration.

In another embodiment, one or more non-transitory computer readable storage media is provided, and is encoded with instructions that, when executed by a processor, cause the processor to: cause a predetermined vibration to be induced on a fiber optic cable, the predetermined vibration being sufficient to cause a change to at least one of a state of polarization and a phase of optical signals being carried by optical fibers in the fiber optic cable, receiving, from a first endpoint using a first coherent optical receiver, and from a second endpoint using a second coherent optical receiver, an indication of the change to the at least one of the state of polarization and the phase of the optical signals, and based on the indication, determining that the first endpoint and the second endpoint are in communication with one another via at least one fiber in the fiber optic cable.

The predetermined vibration may be induced with a fixed device.

The predetermined vibration may include information modulated into the predetermined vibration.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   inducing a predetermined vibration on a fiber optic cable, the predetermined vibration being sufficient to cause a change to at least one of a state of polarization and a phase of optical signals being carried by optical fibers in the fiber optic cable;
   detecting, at a first endpoint, using a first coherent optical receiver, and at a second endpoint, using a second coherent optical receiver, the change to the at least one of the state of polarization and the phase of the optical signals;
   assigning a first timestamp representative of when the first coherent optical receiver detected the change to the at least one of the state of polarization and the phase of the optical signals;
   assigning a second timestamp representative of when the second coherent optical receiver detected the change to the at least one of the state of polarization and the phase of the optical signals;
   comparing the first timestamp to the second timestamp; and
   based on a result of the comparing, determining that the first endpoint and the second endpoint are in communication with one another via at least one fiber in the fiber optic cable.

2. The method of claim 1, further comprising inducing the predetermined vibration adjacent a building.

3. The method of claim 1, further comprising detecting the change to the at least one of the state of polarization and the phase of the optical signals at a third endpoint.

4. The method of claim 1, wherein inducing the predetermined vibration is performed with a mobile device.

5. The method of claim 4, wherein the mobile device is conveyed by a motor vehicle.

6. The method of claim 1, wherein the optical signals are data communication signals passing between the first endpoint and the second endpoint.

7. The method of claim 1, further comprising modulating information into the predetermined vibration.

8. The method of claim 7, wherein the information comprises at least one of a cable identifier and location information.

9. The method of claim 8, further comprising geo-mapping a route of the fiber optic cable based on the location information.

10. The method of claim 1, wherein the determining comprises correlating a first time that the first coherent optical receiver detects the at least one of the state of polarization and the phase of a given one of the optical signals and a second time that the second coherent optical receiver detects the at least one of the state of polarization and the phase of the given one of the optical signals.

11. A device comprising:
an interface configured to enable network communications;
a memory; and
one or more processors coupled to the interface and the memory, and configured to:
cause a predetermined vibration to be induced on a fiber optic cable, the predetermined vibration being sufficient to cause a change to at least one of a state of polarization and a phase of optical signals being carried by optical fibers in the fiber optic cable;
receive, from a first endpoint using a first coherent optical receiver, a first indication and a first timestamp representative of when the first endpoint detected the change to at least one of the state of polarization and the phase of the optical signals;
receive, from a second endpoint using a second coherent optical receiver, a second indication and a second timestamp representative of when the second endpoint detected the change to the at least one of the state of polarization and the phase of the optical signals; and
based on the first indication, the first timestamp, the second indication and the second timestamp determine that the first endpoint and the second endpoint are in communication with one another via at least one fiber in the fiber optic cable.

12. The device of claim 11, wherein the predetermined vibration is induced with a fixed device.

13. The device of claim 12, wherein the fixed device is adjacent a building.

14. The device of claim 11, wherein the predetermined vibration is induced with a mobile device.

15. The device of claim 14, wherein the mobile device is conveyed by a motor vehicle.

16. The device of claim 11, wherein the optical signals are data communication signals passing between the first endpoint and the second endpoint.

17. The device of claim 11, wherein the predetermined vibration includes information modulated into the predetermined vibration.

18. One or more non-transitory computer readable storage media encoded with instructions that, when executed by a processor, cause the processor to:
cause a predetermined vibration to be induced on a fiber optic cable, the predetermined vibration being sufficient to cause a change to at least one of a state of polarization and a phase of optical signals being carried by optical fibers in the fiber optic cable;
receiving, from a first endpoint using a first coherent optical receiver, a first indication and a first timestamp representative of when the first endpoint detected the change to at least one of the state of polarization and the phase of the optical signals;
receiving, from a second endpoint using a second coherent optical receiver, a second indication and a second timestamp representative of when the second endpoint detected the change to the at least one of the state of polarization and the phase of the optical signals; and
based on the first indication, the first timestamp, the second indication and the second timestamp determining that the first endpoint and the second endpoint are in communication with one another via at least one fiber in the fiber optic cable.

19. The one or more non-transitory computer readable storage media of claim 18, wherein the predetermined vibration is induced with a fixed device.

20. The one or more non-transitory computer readable storage media of claim 18, wherein the predetermined vibration includes information modulated into the predetermined vibration.

* * * * *